UNITED STATES PATENT OFFICE.

HENRY D. BODDINGTON, OF LOS ANGELES, CALIFORNIA.

FOOD COMPOUND FOR MAKING CUSTARD.

1,266,201.          Specification of Letters Patent.      Patented May 14, 1918.

No Drawing.      Application filed October 26, 1917. Serial No. 198,694.

*To all whom it may concern:*

Be it known that I, HENRY D. BODDINGTON, a subject of the King of Great Britain, residing at Los Angeles, in the county of Los Angeles and State of California, have invented new and useful Improvements in Food Compound for Making Custard, of which the following is a specification.

My invention relates to a food compound for making custard.

It is an object of my invention to provide a food compound containing tonic properties in the form of a dry powder, which, when added to water and heated, will make a superior custard.

My invention consists in the compound hereinafter described and claimed.

My food compound is prepared as follows:

80 gallons of skimmed milk are heated to 30° C., and the casein is precipitated by the addition of hydrochloric acid. The precipitate is carefully washed to remove all residual matter and is dissolved in a solution of sodium carbonate. Lactic acid is now added to the solution to re-precipitate the casein. The casein precipitate is now washed with water, carefully dried, and pulverized. The resulting casein weighs about 6 lbs. It is now mixed with 30 lbs. of rice starch and 30 lbs. of corn starch, 35 lbs. of powdered milk, and 10 lbs. of pulverized egg yolk. Flavoring extract, such as vanilla or lemon, is added, two ounces being usually sufficient, and four ounces of vegetable coloring matter.

The whole mixture is ground in a pebble mill or any other suitable mill for two hours and immediately after the grinding operation is packed in air-tight containers.

One to two ounces of my food compound to one pint of water will make a delicious and nutritious custard to serve with stewed or bottled fruits.

Mix the food compound with a small portion of the water into a smooth cream. Bring the remainder of the water to a boil and then stir in the food compound. Add sugar to taste and boil five minutes. The natural sweetening qualities of my food compound will materially reduce the amount of sugar necessary for sweetening the fruit and will at the same time neutralize the excess acidity of the fruit.

My food compound is an ideal substitute for cream in making sauces for puddings and desserts, also for making nutritious and delicious ice-cream.

Although I prefer to prepare the casein as described, it will be understood that casein prepared in any other suitable manner may be substituted therefor.

While good results are obtained when proportions of the ingredients are somewhat varied from those given above, or suitable equivalents are substituted for the ingredients, the best results are obtained by following the directions rather closely.

I claim:

1. A powdered food compound for making custard, comprising casein, starch, powdered milk, and albumen.

2. A powdered food compound for making custard, comprising casein, starch, powdered milk, and egg yolk.

3. A powdered food compound for making custard, consisting of six parts of casein, sixty parts of starch, thirty-five parts of powdered milk, and ten pounds of egg yolk.

In testimony whereof I have signed my name to this specification.

HENRY D. BODDINGTON.